(12) United States Patent
In Albon

(10) Patent No.: US 7,178,453 B2
(45) Date of Patent: Feb. 20, 2007

(54) MEANS FOR PRODUCING MILK OR FROTHY MILK DRINKS

(75) Inventor: Jean-Paul In Albon, Ardon (CH)

(73) Assignee: Steiner AG, Weggis, Weggis (CH)

( * ) Notice: Subject to any disclaimer, the term of this patent is extended or adjusted under 35 U.S.C. 154(b) by 0 days.

(21) Appl. No.: 10/989,659

(22) Filed: Nov. 17, 2004

(65) Prior Publication Data

US 2005/0112262 A1 May 26, 2005

(30) Foreign Application Priority Data

Nov. 20, 2003 (EP) .................................. 03405833

(51) Int. Cl.
*A47J 31/00* (2006.01)
(52) U.S. Cl. ........................................ 99/295; 99/323.1
(58) Field of Classification Search .................. 99/293, 99/295, 323.1, 323.3, 302 R
See application file for complete search history.

(56) References Cited

U.S. PATENT DOCUMENTS 5,052,289 A * 10/1991 Di Girolamo ................ 99/452
6,810,795 B1 * 11/2004 Hsu ............................ 99/453

FOREIGN PATENT DOCUMENTS

WO    WO 03/082065    * 10/2003

* cited by examiner

*Primary Examiner*—Reginald L. Alexander
(74) *Attorney, Agent, or Firm*—Wenderoth, Lind & Ponack, L.L.P.

(57) ABSTRACT

An apparatus for producing milk drinks or foamed milk drinks, especially for a coffee machine, is envisaged with a capsule (1, 1', 1") containing a pre-determined quantity of milk for a single use. The capsule (1, 1', 1") can be positioned above an outlet (2) and heated. In addition, a device for opening the floor (9, 9a) to extract the milk from the capsule (1, 1', 1") should be provided so that air can be added to the milk exiting from the capsule (1, 1', 1") for a possible foaming of the milk. The apparatus is simple and cost-effective and simple to maintain.

10 Claims, 2 Drawing Sheets

MEANS FOR PRODUCING MILK OR FROTHY MILK DRINKS

BACKGROUND OF THE INVENTION

1. Field of the Invention

The present invention concerns an apparatus for producing milk drinks.

2. Description of Related Art

An apparatus of this type, especially envisaged for producing milk foam for cappuccino coffee, is for example known from EP-A-600 826. The milk is heated in a container enclosed by a heating vessel and pressed through a resistance processing element with the aid of a pump, in which the milk froth is produced by adding an air mixture. With this apparatus all pipes and lines for the milk, i.e. from container to outlet, must be cleaned regularly, which involves a cumbersome cleaning procedure each and every time, and which necessitates a relatively complicated dismantling of the means from time to time.

SUMMARY OF THE INVENTION

It is the purpose of this invention to provide a means of the type described above which allows a more simple maintenance process.

The task is solved in accordance with the invention by providing a means for producing milk drinks or foamed milk drinks including a disposable capsule containing a predetermined quantity of milk that can be dispensed and combined with air to form milk foam.

The means of this invention is simple and cost-effective, and substantially reduces maintenance. Only the outlet, and possibly a resistance processing disc associated with the outlet, need to be cleaned and are easily accessible. In addition it is possible to select and dispense a desired milk or foamed milk drink in a very simple way.

BRIEF DESCRIPTION OF THE DRAWINGS

The invention will now be described in more detail with reference to the drawings, which illustrate the same in a schematic way.

DETAILED DESCRIPTION OF THE INVENTION

Figure 1:
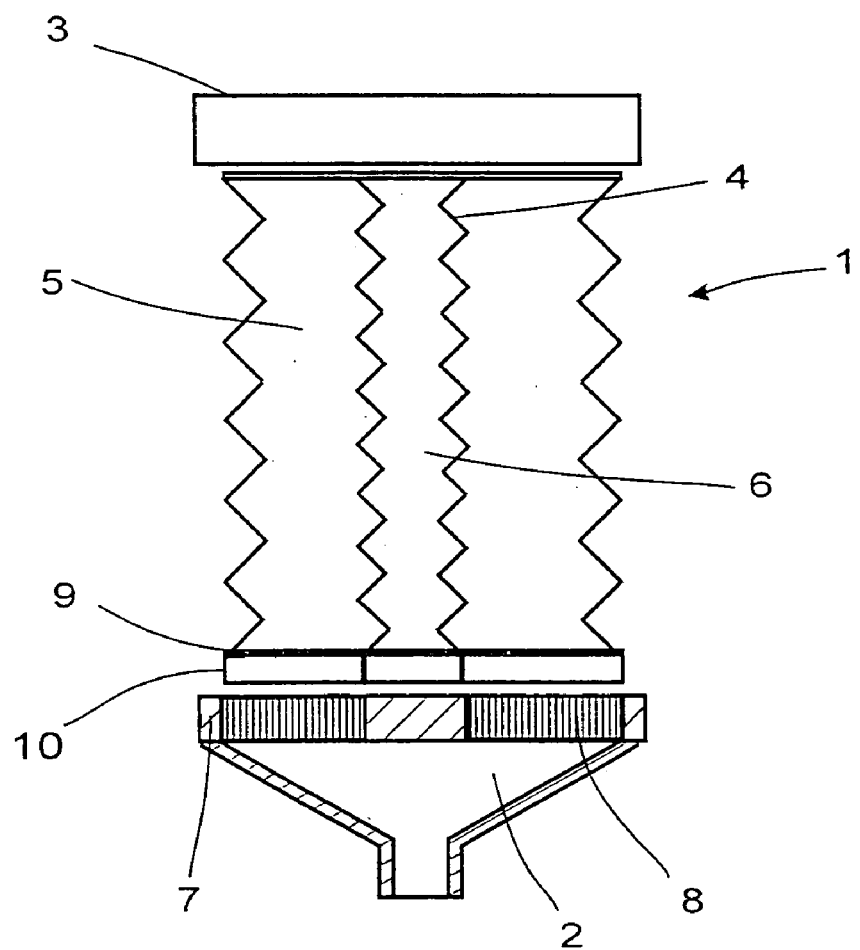
FIG. 1 is a schematic view of an apparatus for producing milk drinks or foamed milk drinks according to a first embodiment of the invention.

FIG. 1 shows a part of a means of this invention for producing milk or foamed milk drinks, which is envisaged especially for a coffee machine. A capsule 1 in the form of a bellows of the type of a concertina closed towards the front and compressible in the direction of the outlet 2 with an upper, vertically adjustable compression part 3 is positioned above the outlet 2. The bellows-shaped capsule 1 incorporates a further, also bellows-shaped part 4 which forms an annular space containing milk. This annular milk chamber 5 encloses an inner air chamber 6 filled with air. Instead of milk it can also contain aromatized milk, for example with vanilla, chocolate or other flavors.

A rotation adjustable resistance processing disc 7, equipped with a number of preferably evenly circumferentially distributed resistance processing elements 8 positioned below the milk chamber 5, is associated with the outlet 2. A counter piece 10 representing a main component of the coffee machine, just like for example the disc 7 with the resistance processing elements as well as the outlet 2, cooperates with the floor 9 of the capsule 1 and is positioned above the disc 7. The counter piece 10, against which the capsule 1 with its floor 9 can be pressed with the aid of the compression part 3, is for example equipped with projections which can perforate the floor 9 of the capsule 1 within the area of the milk chamber 5 as well as within the area of the air chamber 6 when the capsule 1 is compressed. Depending on the position of the disc 7 either only milk—cold or heated with a heating means not illustrated in detail here but described in more detail below—can be dispensed directly without having passed the resistance processing elements 8, or the heated milk can be forced through the resistance processing elements 8 together with air forced from the air chamber 6 and thereby foamed.

The means for the heating of the milk can be integrated into the capsule 1 and for example be realized with a heated wire (resistance heater). Other possibilities consist of affixing the heating means at that position of the means, i.e. the coffee machine, which is envisaged to receive the capsule 1, so that the same can act upon the surface of the capsule, whereby the capsule 1 must be manufactured accordingly, i.e. from a heat conducting material. The heating can also be achieved in a contact free manner, for example with microwaves or the like.

Figure 2:
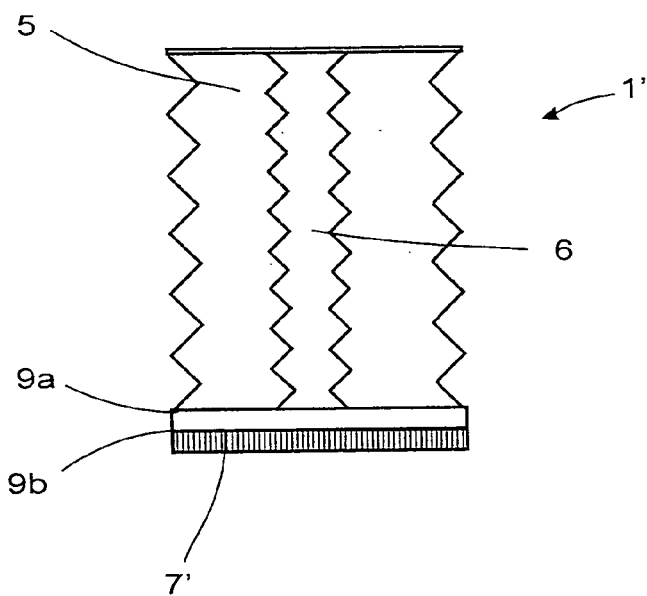
FIG. 2 is a schematic view of a second embodiment of the invention.
Figure 3:
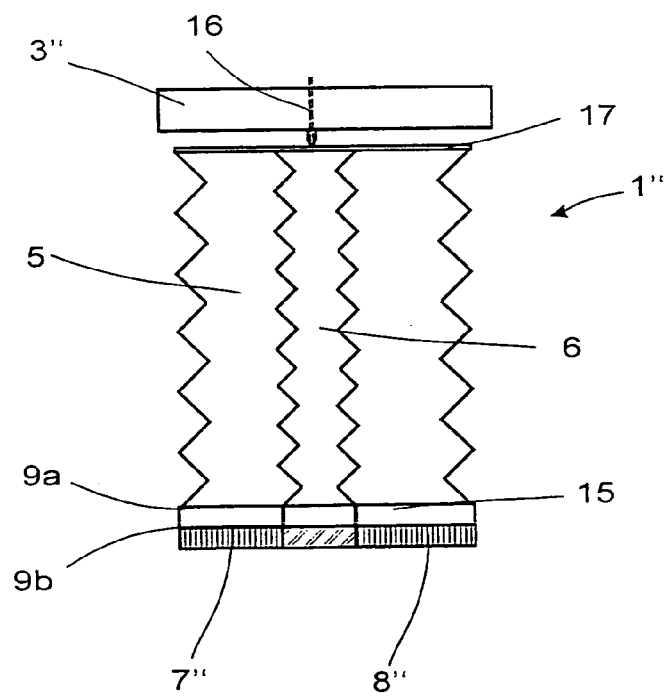
FIG. 3 is a schematic view of a third embodiment of the invention.

With the embodiments illustrated in FIGS. 2 and 3 the resistance processing disc 7', 7" forms a component of the capsule 1', 1", and is located below a double floor 9a, 9b forming a floor chamber 15 (FIG. 2 shows a single-piece resistance processing disc 7', whereas the disc 7" of FIG. 3 incorporates several resistance processing elements 8"). When the capsule 1', 1" is pressed onto the outlet part together with the resistance processing disc 7', 7" and perforates the floor 9a, milk pressed out of the milk chamber 5 is mixed in the floor chamber 15 with air pressed out of the air chamber 6, then forced through the resistance processing disc 7', 7" and foamed. As illustrated in FIG. 3, additional air can be added into the air chamber 6 by applying a force onto compression part 3" and compressing the capsule 1" from above through an air nozzle 16 within the upper front part 17 of the capsule 1".

The capsules 1, 1', 1" consist of disposable capsules which therefore preferably consist of a recyclable material. Preferably several capsules can be arranged within an adjustable, for example rotation adjustable magazine, and each one can be brought into the operating position above the outlet 2 by adjusting the magazine. The capsules may have different contents (aromatised or normal milk) and volumes. The embodiments according to FIG. 2 and 3 can for example envisage capsules for the dispensing of only milk (cold or heated), which would not require the resistance processing disc 7', 7".

In place of a capsule 1, 1', 1" divided into a milk chamber 5 and an air chamber 6 the capsule could contain only milk, and the air could be added to the milk when the same leaves the capsule. The creation of froth can for example be achieved with a known method according to the Venturi principle.

In place of a bellows-shaped capsule 1, 1', 1" the milk or milk/air capsule of this invention could also be equipped with a solid casing and a piston component within the interior of the same for compressing the milk or the air.

The means of this invention is simple and cost-effective, and facilitates easier maintenance. Only the outlet, and with the embodiment illustrated in FIG. 1 the counter piece 10 associated with the outlet 2 as well as the resistance processing disc 7, requires cleaning and is easily accessible. In addition a desired milk or foamed milk drink can be easily selected and dispensed.

The invention claimed is:

1. An apparatus for producing liquid drinks or foamed liquid drinks, said apparatus comprising:
   an outlet structure;
   a capsule defining a liquid chamber and an air chamber that is separate from the liquid chamber, said capsule having a floor member, which is located above said outlet structure and can be opened to permit the dispensing of the liquid from said capsule, and to permit air from the air chamber to be added to the liquid being dispensed from the capsule for the creation of foam; and
   a counter piece disposed adjacent said floor member of said capsule,
   wherein said capsule is in the form of a bellows which is closed at its front end and is compressible against said counter piece under the influence of a force applied in the direction of the outlet structure.

2. The apparatus as claimed in claim 1, wherein the outlet structure or the floor member of the capsule is equipped with a resistance processing disc through which the liquid exiting from the capsule can be conveyed.

3. The apparatus as claimed in claim 1, further comprising a resistance processing disc associated with the outlet structure, wherein the counter piece cooperates with the floor of the capsule and is positioned over the resistance processing disc, and wherein the resistance processing disc is rotatably adjustable and is equipped with a number of resistance processing elements arranged in a circle.

4. The apparatus as claimed in claim 1, wherein the liquid chamber is an annular chamber that surrounds the air chamber.

5. The apparatus as claimed in claim 3, further comprising an air nozzle for supplying air, said air nozzle can be inserted through the closed end of said capsule into the air chamber during compression of said capsule.

6. An apparatus for producing milk drinks or foamed milk drinks, said apparatus comprising:
   an outlet structure;
   a capsule having an outlet end disposed adjacent said outlet structure, said capsule defining a milk chamber for holding a predetermined quantity of milk, and an air chamber that is separate from said milk chamber,
   wherein the outlet end of said capsule is provided with floor parts associated with said milk chamber and said air chamber, respectively, and
   wherein said floor parts of said capsule can be opened so that air can be added to the milk exiting from said milk chamber for the creation of foam.

7. The apparatus as claimed in claim 6, further comprising a resistance processing disc associated with the outlet structure, and a counter piece cooperating with the floor of the capsule and positioned above the resistance processing disc, wherein the resistance processing disc is rotatably adjustable and is equipped with a number of resistance processing elements arranged in a circle.

8. The apparatus as claimed in claim 6, further comprising a processing disc connected to said outlet structure, said processing disc comprising a plurality of processing elements.

9. An apparatus for producing milk drinks or foamed milk drinks, said apparatus comprising:
   an outlet structure;
   a collapsible capsule defining a milk chamber for holding a predetermined quantity of milk, said capsule having a floor member, which is located above said outlet structure and can be opened to permit dispensing of the milk from said capsule, wherein said capsule comprises an outer wall and an inner wall spaced from said outer wall so as to form an annular milk chamber and an inner air chamber that is surrounded by said annular milk chamber, wherein air can be added to the milk dispensed from said capsule for the creation of foam; and
   a counter piece disposed adjacent said floor member of said capsule,
   wherein said capsule is closed at an end that is remote from said floor member, and said capsule is compressible in the direction of the outlet structure and against said counter piece.

10. The apparatus as claimed in claim 9, wherein the collapsible capsule is disposable.

* * * * *